United States Patent [19]
Yang et al.

[11] Patent Number: 5,202,755
[45] Date of Patent: Apr. 13, 1993

[54] ENCODING SYSTEM OF A SIMULCAST HIGH DEFINITION TELEVISION AND METHOD THEREOF

[75] Inventors: Tae-Kwon Yang; Dong-Il Song, both of Suwon, Rep. of Korea

[73] Assignee: Samsung Electronics Co., Ltd., Suwon, Rep. of Korea

[21] Appl. No.: 812,943

[22] Filed: Dec. 24, 1991

[30] Foreign Application Priority Data

Jan. 22, 1991 [KR] Rep. of Korea .................. 1991-1022

[51] Int. Cl.$^5$ .......................... H04N 7/00; H04N 11/00
[52] U.S. Cl. ....................................... 358/12; 358/141; 358/36
[58] Field of Search ................ 358/141, 142, 133, 12, 358/138, 36, 167, 32

[56] References Cited

U.S. PATENT DOCUMENTS

| | | | |
|---|---|---|---|
| 4,918,515 | 4/1990 | Faroudja | 358/12 X |
| 4,979,041 | 12/1990 | Schreiber | 358/141 |
| 5,010,405 | 4/1991 | Schreiber et al. | 358/141 |
| 5,021,882 | 6/1991 | Schreiber | 358/141 |
| 5,063,445 | 11/1991 | Nishizawa et al. | 358/138 |
| 5,127,021 | 6/1992 | Schreiber | 358/141 X |

FOREIGN PATENT DOCUMENTS

0311188 4/1989 European Pat. Off. .

OTHER PUBLICATIONS

William F. Schreiber, "6-MHZ Single-Channel HDTV Systems", HDTV Symposium, Ottawa, Oct. 1987, pp. 1–9.

Primary Examiner—James J. Groody
Assistant Examiner—Safet Metjahic
Attorney, Agent, or Firm—Robert E. Bushnell

[57] ABSTRACT

An encoding system of a simulcast high definition television and a method thereof capable of encoding an image signal of high picture quality and an aural signal of high tone quality. In order to improve a MIT proposal system, the bandwidth of a baseband image signal of a high definition television is compressed by a three-dimensional sub-band coding, divided sub-blocks are adaptively selected and modulated. Thereafter, the adaptive modulated signal is scrambled, transmission-gamma-processed, data-under-processed and processed by a double side band-quadrature modulation (DSB-QM). Thus, good picture quality in comparison with the MIT proposal system is obtainable.

7 Claims, 13 Drawing Sheets

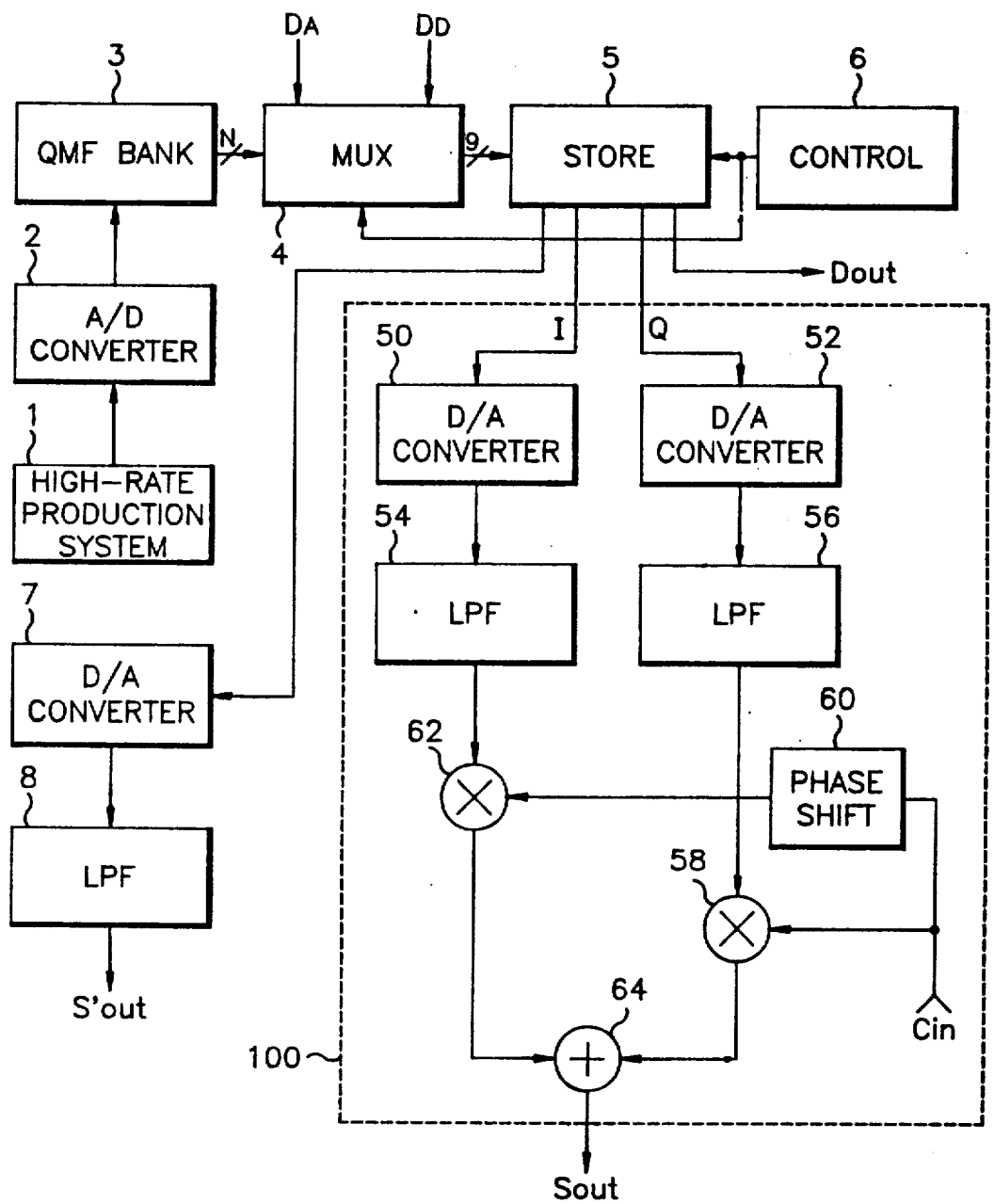
(PRIOR ART)
FIG. 1

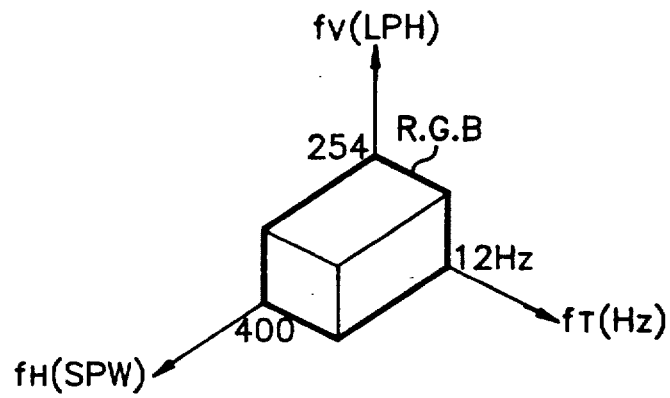
(PRIOR ART)
*FIG. 2A*
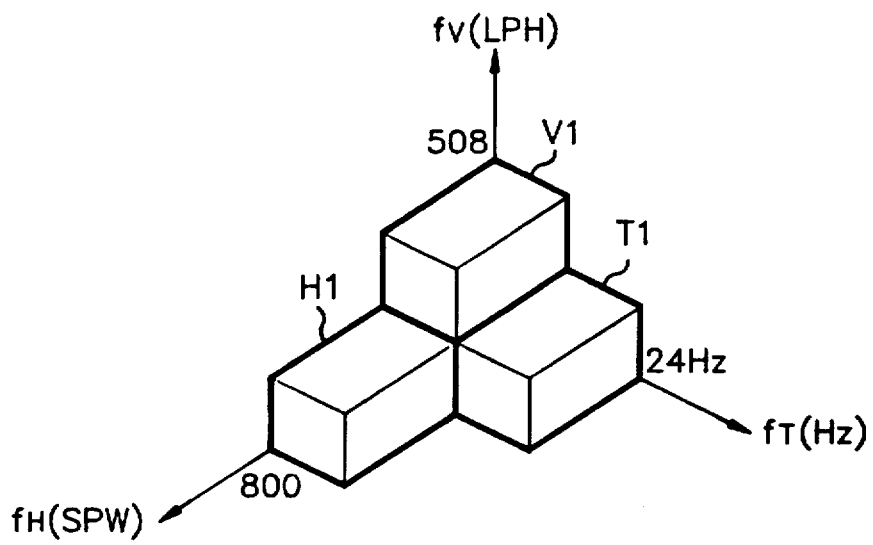
(PRIOR ART)
*FIG. 2B*

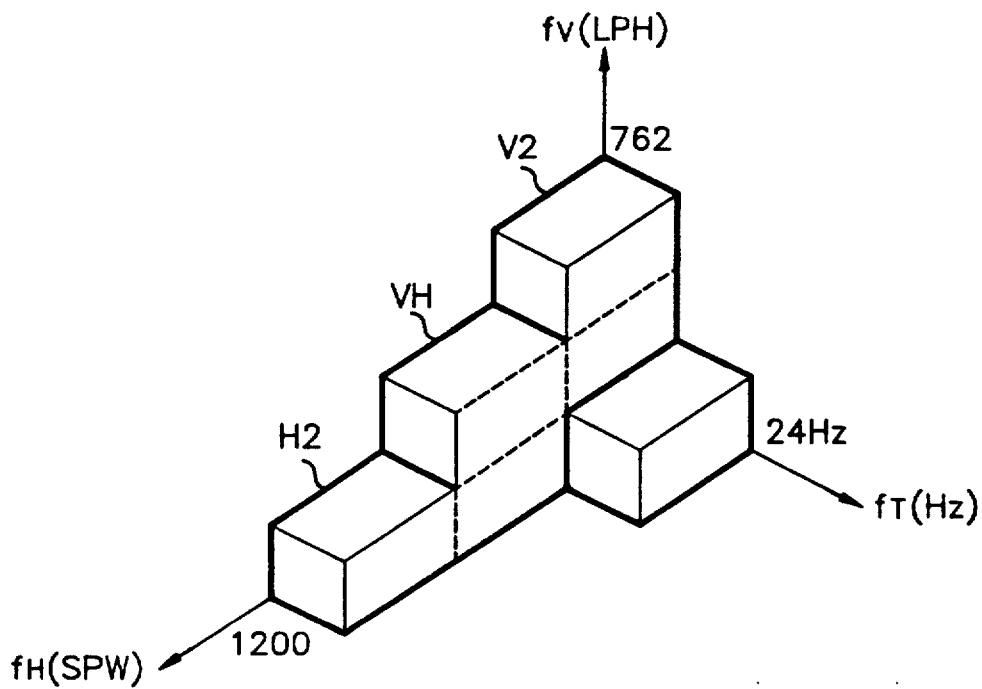
(PRIOR ART)
*FIG. 2C*
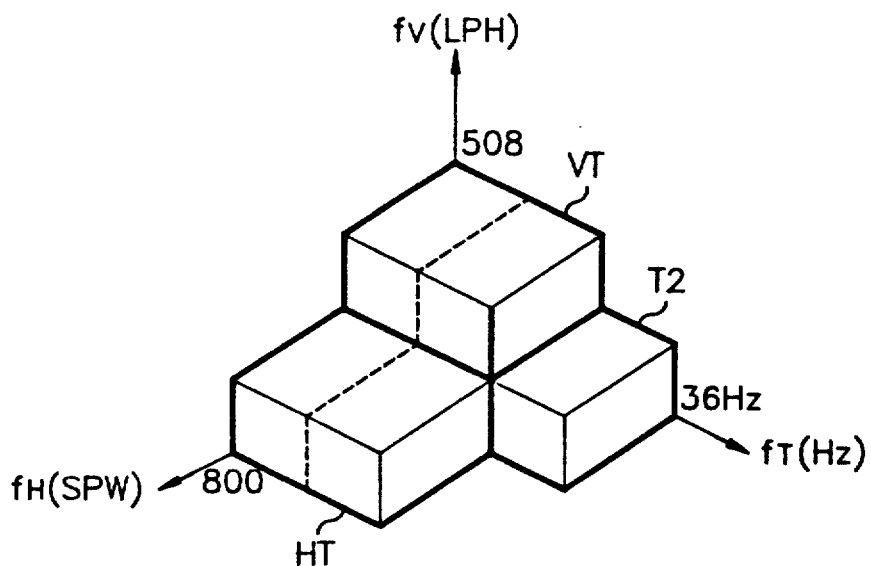
(PRIOR ART)
*FIG. 2D*

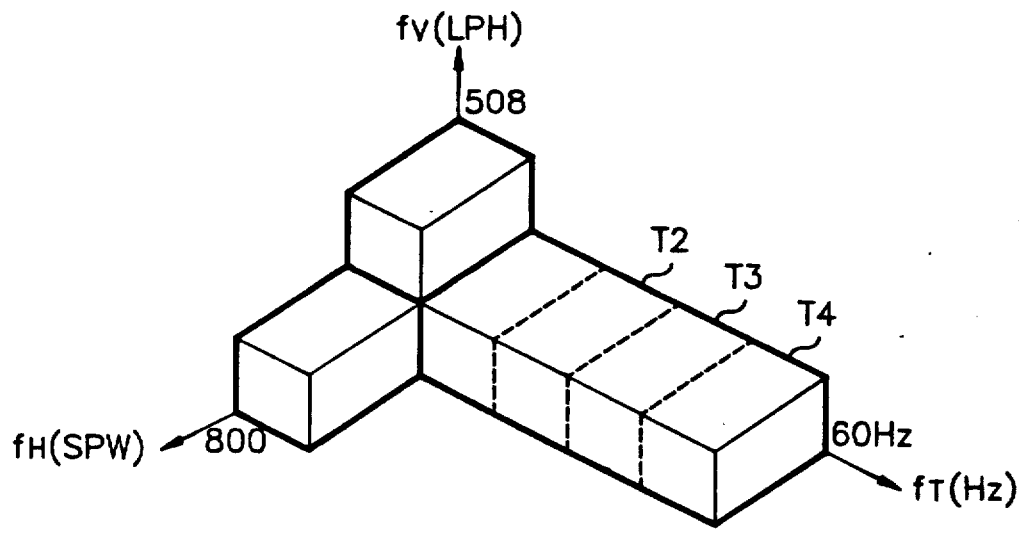
(PRIOR ART)
FIG. 2E
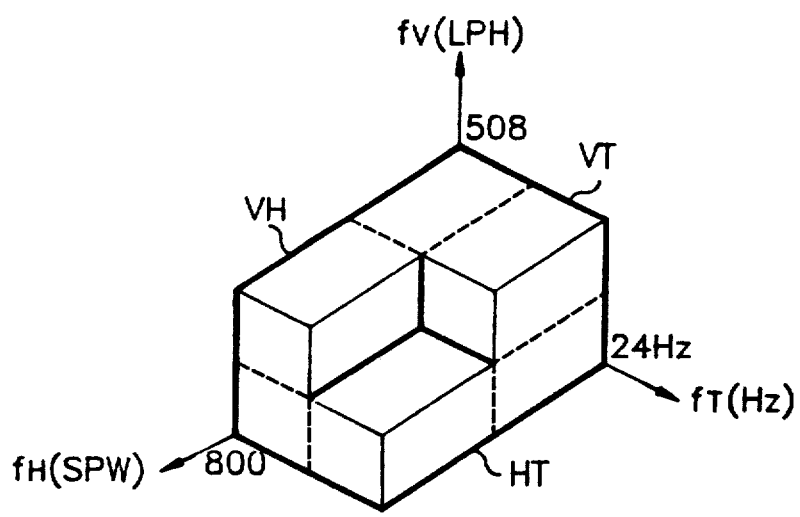
(PRIOR ART)
FIG. 2F

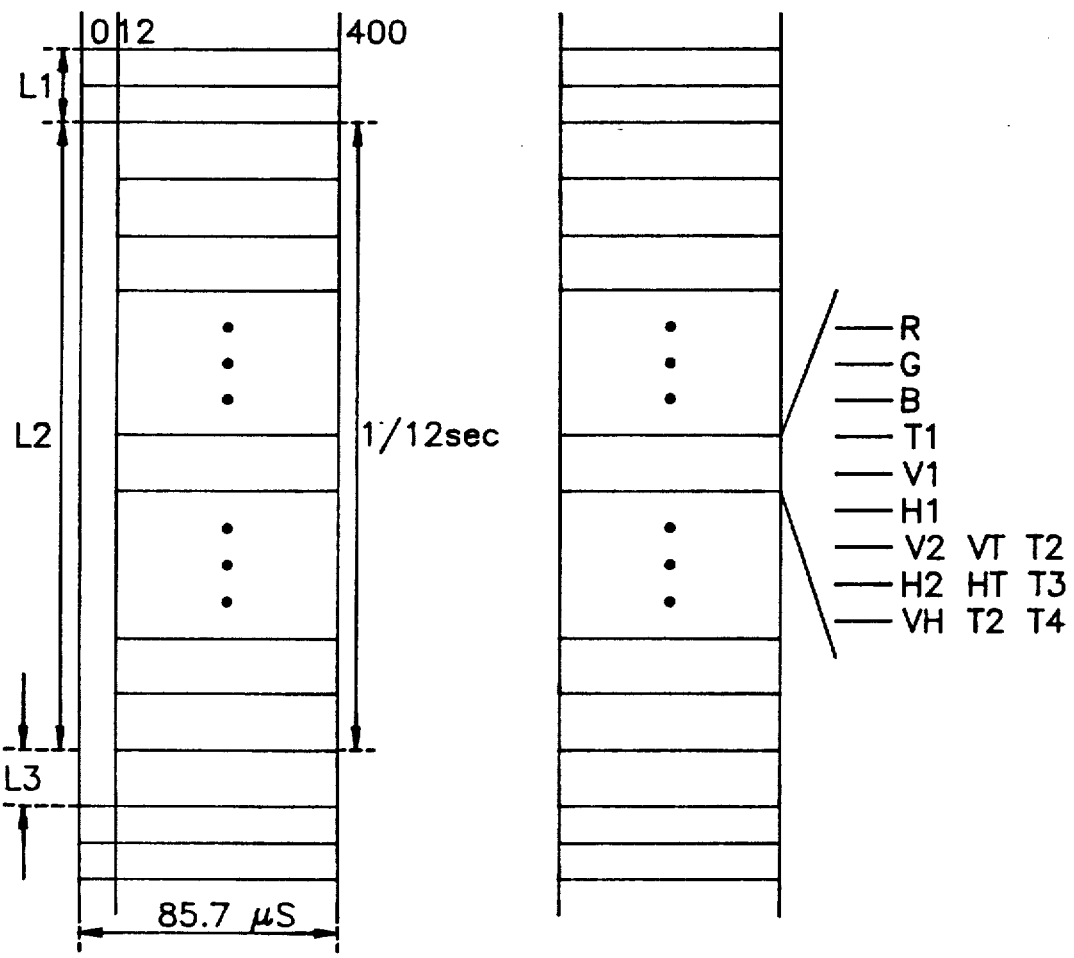
(PRIOR ART)
FIG. 3A
(PRIOR ART)
FIG. 3B

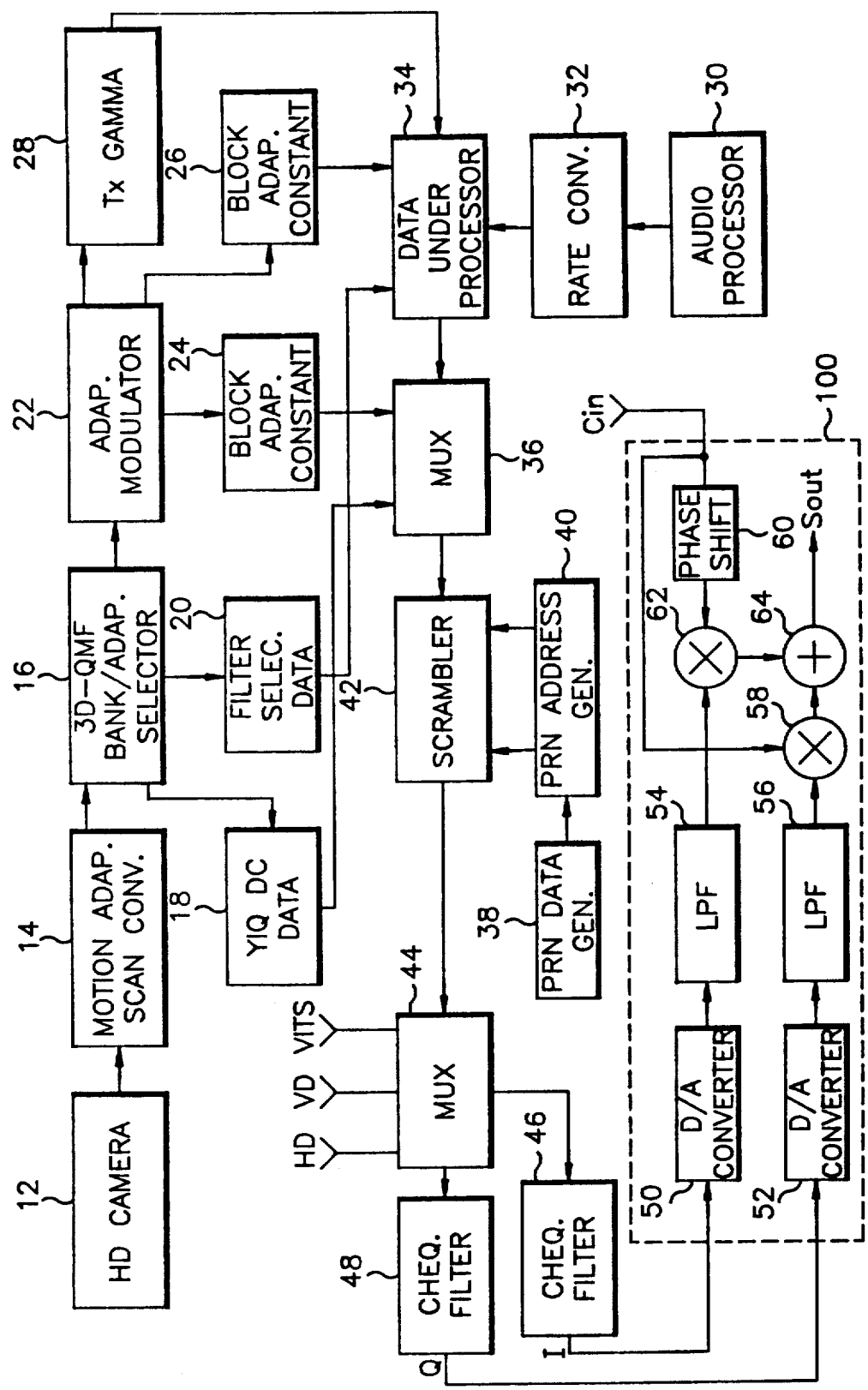
FIG. 4

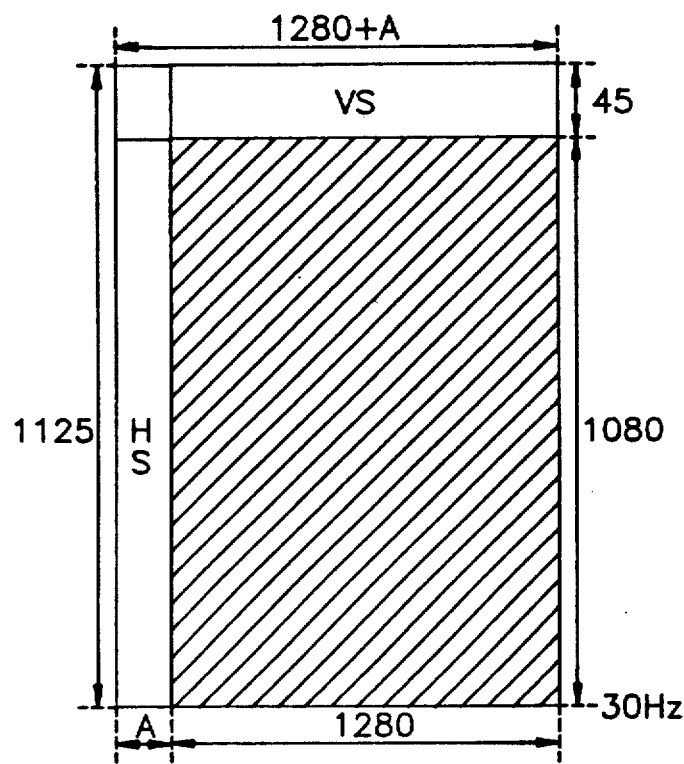
FIG. 5
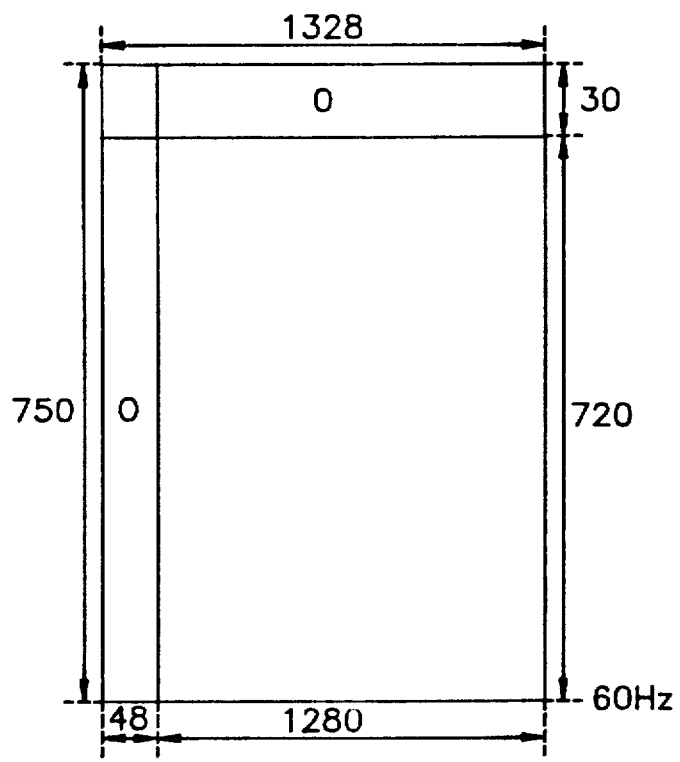
FIG. 6

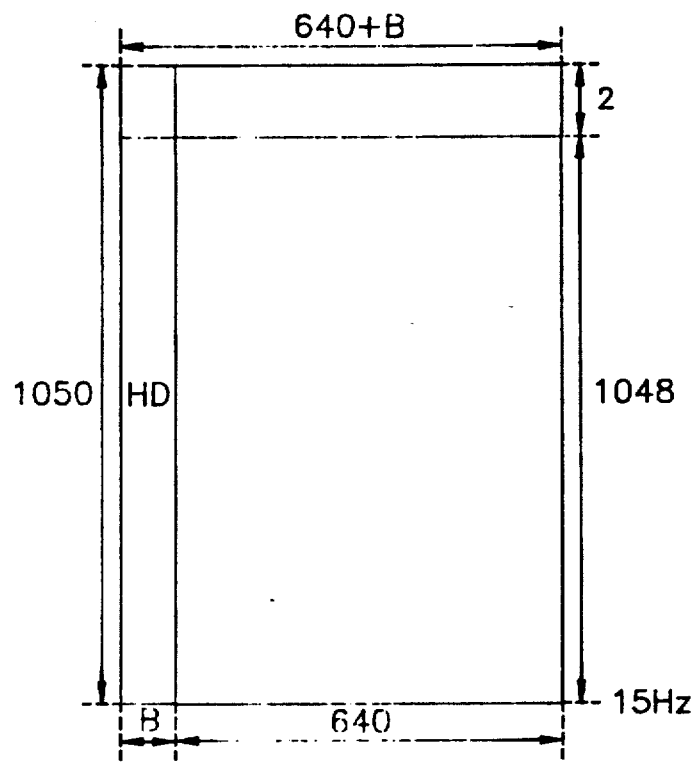
FIG. 7
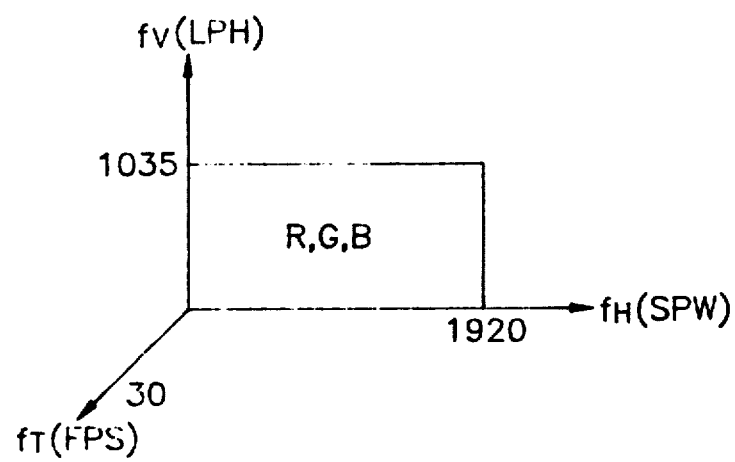
FIG. 9

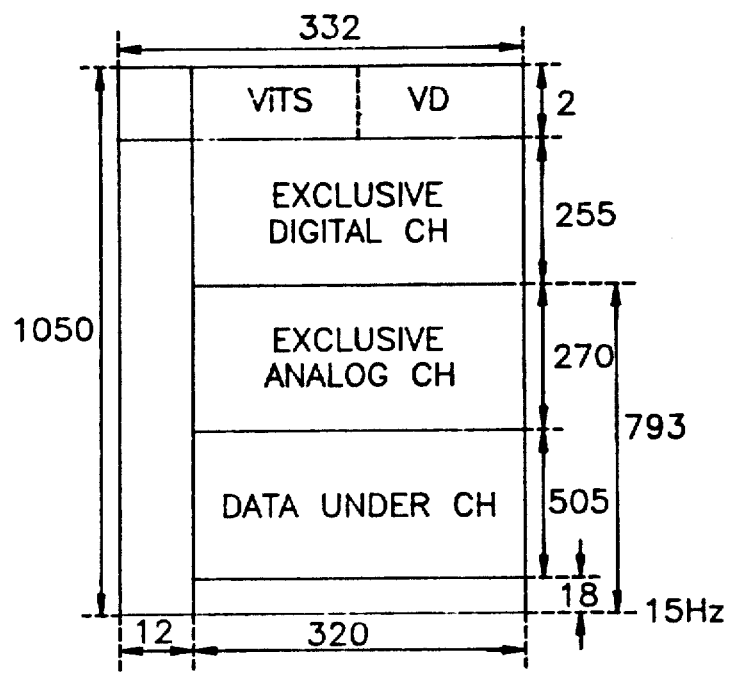
FIG. 8A
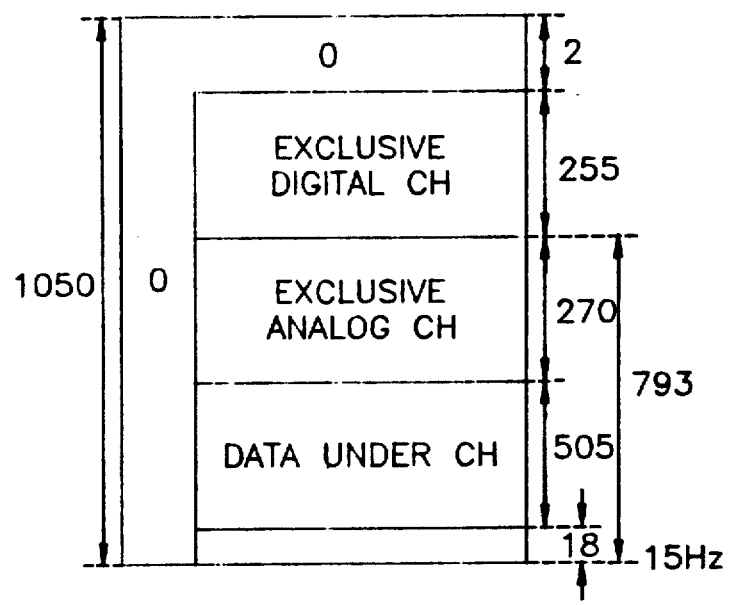
FIG. 8B

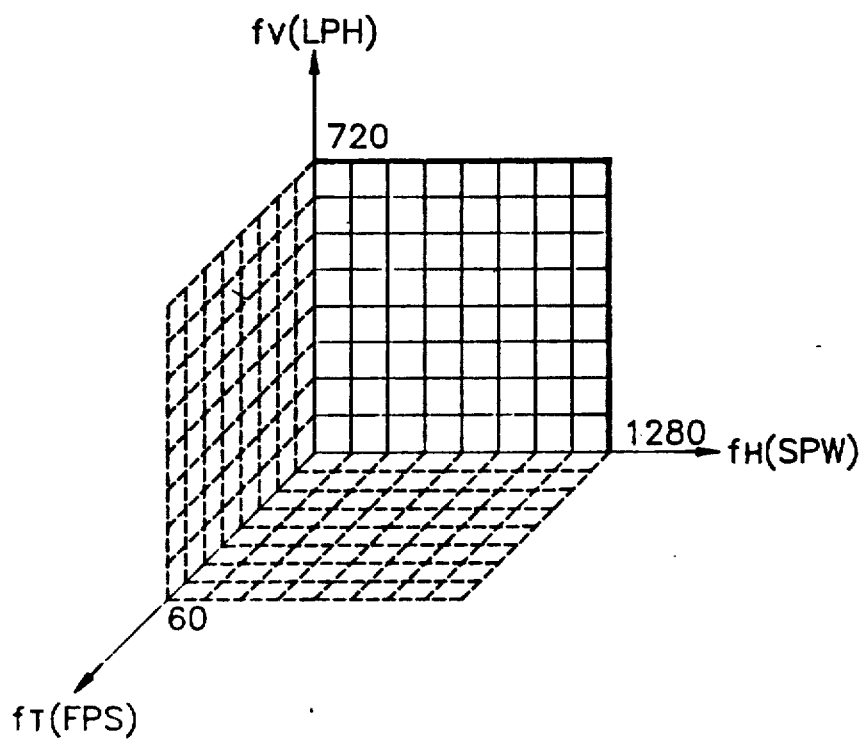
FIG. 10
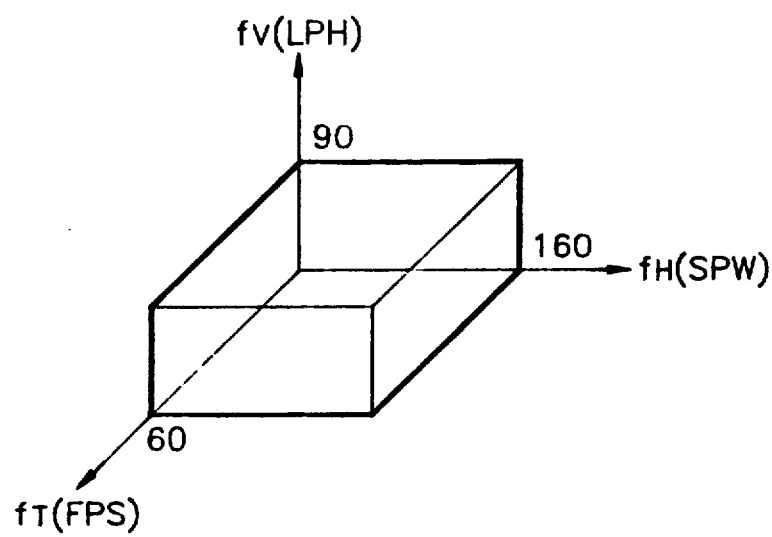
FIG. 11

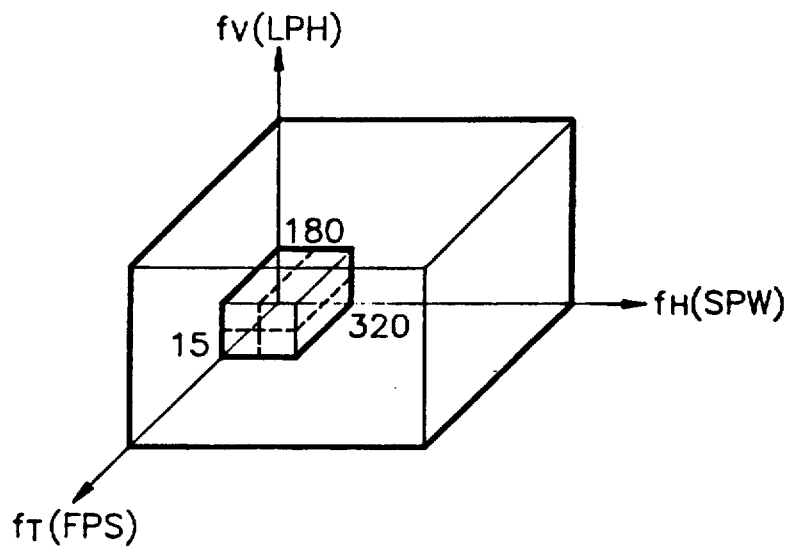
FIG. 12
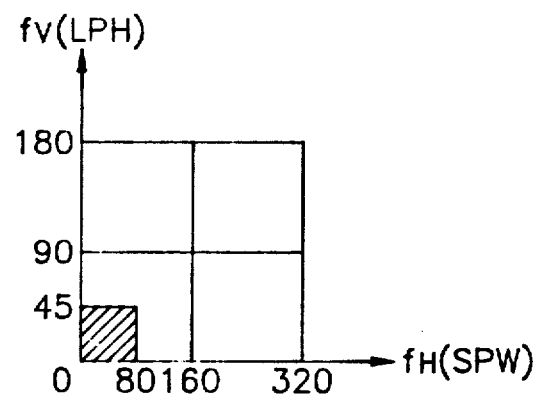
FIG. 13
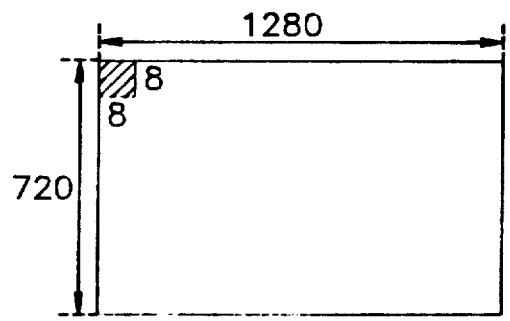
FIG. 14

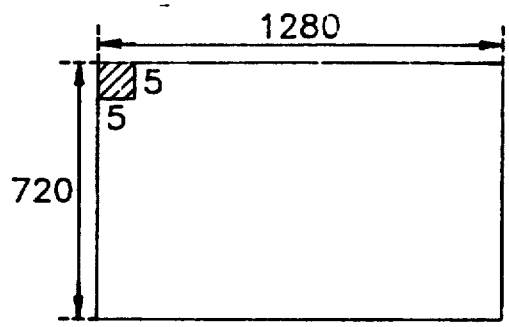
FIG. 15
FIG. 16A
FIG. 16B
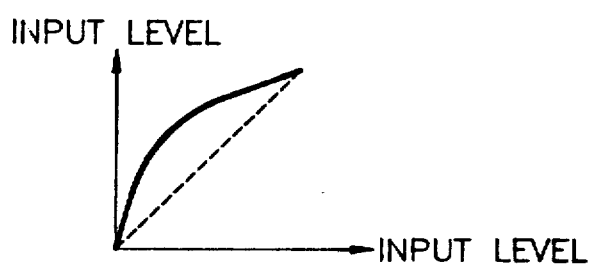
FIG. 18A
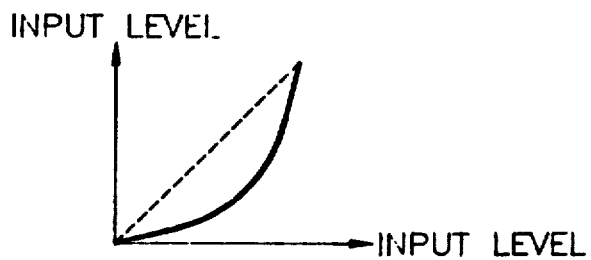
FIG. 18B

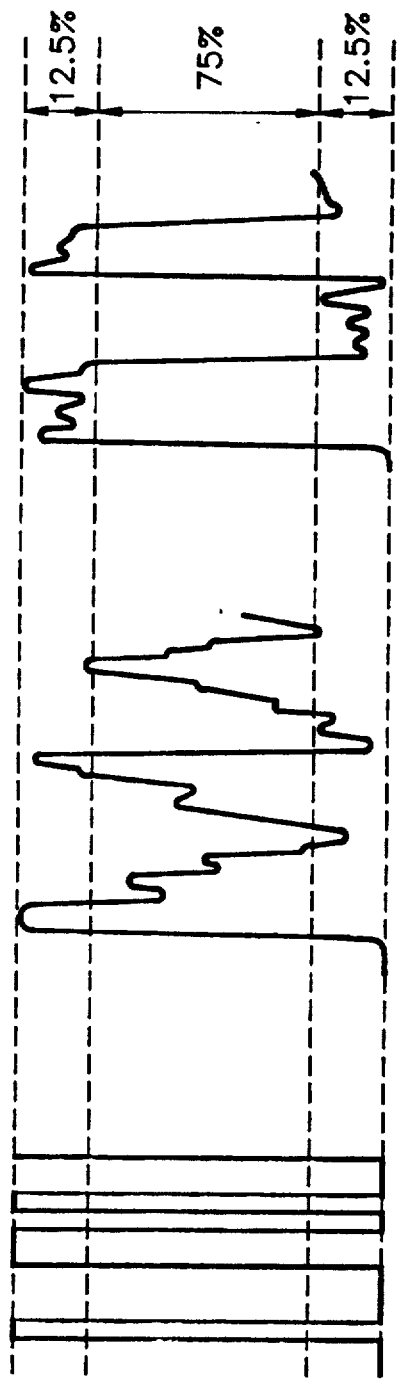

ENCODING SYSTEM OF A SIMULCAST HIGH DEFINITION TELEVISION AND METHOD THEREOF

BACKGROUND OF THE INVENTION

The present invention relates to an encoding system of a simulcast high definition television and a method thereof, and more particularly to an encoding system and a method for transmitting a high definition television (hereinafter referred to as HDTV) signal through a presently used VHF or UHF channel by using a HDTV bandwidth compression utilizing the three-dimensional sub-band coding, adaptive modulation, scrambling, double side band-quadrature modulation (DSB-QM), data-under technique, in a land simulcast HDTV for transmitting an image signal of high picture quality and an aural signal of high tone quality through an NTSC transmission channel by compressing bandwidth with a sub-band coding method.

In a HDTV, real studies for a simulcast system bandwidth-compressing an image signal of high picture quality and an aural signal of high tone quality by a sub-band coding technique and transmitting the bandwidth-compressed signal to a presently used NTSC transmission channel has done from the year 1983 at MIT (Massachusetts Institute of Technology). The system proposed by MIT is being watched in that there is no necessity for newly establishing and increasing an additional transmitting system or a relay equipment because of the VHF or UHF channel being used as a transmission channel even if it is not compatible with the presently used NTSC system television set. In the above simulcast system, since the image information having high picture quality should be transmitted to a taboo channel, i.e., a 6 MHz band of an unused channel between channels in order to exclude interference caused by the transmission between adjacent channels, the bandwidth compression technique is important. Moreover, in order to prevent from the adjacent inter-channel interference, a transmission signal level must be reduced. Thus, a method for digitally transmitting a direct current (hereinafter referred to as the DC) component of the transmission signal, or minimizing the level of a modulation signal by using the DSB-QM of a carrier suppression modulation technique is considered. Further, in order to reduce a channel noise or a ghost, scrambling is performed, with the result that the improved picture quality can be obtained by uniformly distributing the noise and ghost appearing as dense forms at a narrow region to the entire region of a screen. In addition, there is an adaptive modulation system for reducing the noise of a transmission channel. That is, in a transmitting side, an image signal of a low level is amplified up to the maximum allowable transmission level and an adaptive constant, i.e., an amplification coefficient is digitally transmitted to a receiving side. Thereafter, in the receiving side, the received image signal is divided by the adaptive constant. Accordingly, since the received image signal is restored to the original signal level and the channel noise is also divided, the channel noise is reduced as much as the divided adaptive constant.

FIG. 1 is a block diagram of an encoding system according to the above described MIT proposal system. An image signal of high picture quality from a high-rate production system 1 is digitally converted in an analog to digital (A/D) converter 2 and is applied to a quadrature mirror filter (QMF) bank 3. The QMF bank 3 transmits corresponding sub-blocks among forty-five sub-blocks to a multiplexer 4, in response to a motion detection mode of an input signal, as shown in FIGS. 2A to 2F. Moreover, aural data $D_A$ and transmission data $D_D$ are applied to the multiplexer 4. In this case, the transmission data $D_D$ represent data output from a facsimile, a telex, a telephone, etc. The multiplexer 4 time-divisionally multiplexes the sub-block from the QMF bank 3, the aural data $D_A$ and the transmission data $D_D$ under the control of a controller 6 so as to generate nine sub-blocks. The three sub-blocks of R.G.B (red, green and blue) as shown in FIG. 2A and the three base band sub-blocks of V1, H1 and T1 as shown in FIG. 2B are always transmitted, and the three sub-blocks shown in FIGS. 2C to 2F are additionally transmitted according to the motion detection mode. For example, if the input image signal is a still picture, the three sub-blocks of V2, VH and H2 shown in FIG. 2C are added to the sub-blocks of FIG. 2B, and if it is a semi-motion picture, the three sub-blocks of T2, VT and HT shown in FIG. 2D are adder thereto. Moreover, if it is a motion picture, the three sub-blocks of T2, T3 and T4 shown in FIG. 2E are added to the sub-blocks of FIG. 2B, and if the input image signal is a movie picture, etc., the three sub-blocks of VH, VT and HT shown in FIG. 2F are added thereto. In this case, the unit of a vertical axis $f_V$ is the number of lines per picture height (hereinafter referred to as the LPH), the unit of a horizontal axis $f_H$ is the number of samples per picture width (hereinafter referred to as the SPW) and the unit of a time axis $f_T$ is the number of frames per second (hereinafter referred to as the FPS).

Next, in a storage circuit 5 of FIG. 1, the time-division multiplexed data is scrambled by the control of the controller 6, and in order to transmit the scrambled data to a transmission channel of 6 MHz, the DSB-QM is performed with formats shown in FIGS. 3A and 3B in a modulating unit 100. In this case, the scrambled data from the storage circuit 5 has in-phase channel data I as shown in FIG. 3A and quadrature phase channel data Q shown in FIG. 3B. In FIGS. 3A and 3B, a L1 is two lines for transmitting a vertical synchronizing signal, a line L2 is for transmitting the image signal and a L3 having 105 lines is for transmitting the aural data $D_A$ and the transmission data $D_D$. In the modulating unit 100, the in-phase channel data I is applied to a first D/A (Digital to Analog) converter 50 and the quadrature channel data Q is applied to a second D/A converter 52, so as to produce analog signals.

In a mixer 62, the low-pass filtered in-phase channel signal through a first low pass filter (LPF) 54 at 3 MHz is mixed with a signal from a 90° phase shifter 60, where a carrier through $C_{in}$ is 90° phase shifted, and is modulated. The low-pass filtered quadrature channel signal through a second LPF 56 at 3 MHz is mixed with the carrier through $C_{in}$ of a mixer 58 and is modulated. The modulated in-phase and quadrature channel signals are added in an adder 64 to produce a radio frequency signal $S_{out}$. In this case, in the storage circuit 5, Data $D_{out}$ of 8.4 Mbyte/sec or 12 Mbyte/sec for optical transmission may be produced, and a signal $S'_{out}$ for satellite communication of frequency modulation (FM) may be generated through a third D/A converter 7 and a third LPF 8. The third LPF 8 low-pass filters at 6 MHz. Since the DSB-QM is a transmission system that a transmission signal is divided into two channels of an in-phase channel and a quadrature phase channel having a phase difference of 90°, it can raise the channel efficiency by two times. In this case, in order to reduce the adjacent inter-channel interference, algorithm for suppressing the radio frequency carrier and removing a DC component is used. Meanwhile, a base band image signal is divided into forty-five sub-blocks in the ratio 3:3:5 in respect to the horizontal axis (H): vertical axis (V): time axis (T), by the three-dimensional sub-band division method in the MIT proposal system. The division of the ratio 8:8:3 with respect to the horizontal axis (H): vertical axis (V): time axis (T) may be possible. Moreover, in the process of the DC component, a luminance low frequency component with respect to four base sub-blocks is processed in two bits, and R-Y and B-Y of a chrominance component are processed in 1 bit, respectively. The signal transmission is performed through a data-under-channel with a form totally superposing an analog signal and a digital signal, and for an adaptive modulation, an adaptive constant and adaptive modulated image information is processed with the data-under.

As described above, the MIT proposal system suggests basic idea for various techniques. However, the detailed technique and definite hardware is not established.

SUMMARY OF THE INVENTION

It is therefore an object of the present invention to provide an encoding system of a simulcast HDTV and method thereof capable of transmitting an image signal of high picture quality and an aural signal of high tone quality to a VHF channel or an UHF channel by utilizing HDTV bandwidth compression using the three-dimensional sub-band coding, adaptive modulation for suppressing a channel noise and a ghost, scrambling, DSB-QM for raising the efficiency of a transmission channel and data-under-technique.

It is another object of the present invention to provide an encoding system of a simulcast HDTV and method thereof capable of reproducing minute motion information and improving resolution by dividing a base band image signal into a three-dimensional sub-band in the ratio 8:8:4 with respect to a horizontal axis: vertical axis: time axis, and compressing the bandwidth of the image signal by sub-band coding to transmit thirty-four sub-blocks.

It is a further object of the present invention to provide an encoding system of a simulcast HDTV and method thereof capable of improving the reproduction of chromaticity, and increasing natural feeling of a screen by processing a luminance low frequency component and chrominance component of R-Y and B-Y in eight bits, respectively and a luminance high frequency component in one bit with respect to four base sub-blocks during sub-band coding.

It is a still another object of the present invention to provide an encoding system of a simulcast HDTV and method thereof capable of ensuring base picture quality of a luminance low frequency component and a chrominance component even if channel to noise ratio (CNR) is below 25 dB by classifying a signal transmission channel to an exclusive analog channel, an exclusive digital channel and a data-under-channel and transmitting the signal through a corresponding channel.

It is a still further object of the present invention to provide an encoding system of a simulcast HDTV and method thereof capable of relatively reducing channel noise in comparison with MIT proposal system by transmitting twelve base sub-blocks to an exclusive analog channel and the other twenty-two sub-band blocks to a data-under-channel.

It is yet another object of the present invention to provide an encoding system of a simulcast HDTV and method thereof capable of suppressing an incoming low frequency noise component during transmission by carrying out a transmission gamma correction process after adaptive modulation.

According to an aspect of the present invention, by using HDTV bandwidth compression utilizing the three-dimensional sub-band coding for improving picture quality, adaptive modulation for suppressing channel noise and ghost, scrambling, DSB-QM for raising the efficiency of a transmission channel and data-under-technique, an image signal of high picture quality and an aural signal of high tone quality can be encoded.

BRIEF DESCRIPTION OF THE DRAWINGS

The above objects and other advantages of the present invention will become more apparent by describing in detail the preferred embodiment of the present invention with reference to the attached drawings in which:

FIG. 1 is a block diagram of an encoding system according to a conventional MIT proposal system;

FIG. 2A to FIG. 2F are diagrams illustrating transmission modes in a frequency area of FIG. 1;

FIG. 3A and FIG. 3B are transmission format diagrams of FIG. 1;

FIG. 4 is a block diagram of an encoding system according to the present invention;

FIG. 5 is a source and display format diagram of FIG. 4;

FIG. 6 is a digital signal process format diagram of FIG. 5;

FIG. 7 is a data transmission format diagram of FIG. 4;

FIG. 8A and FIG. 8B are transmission format diagrams of an in-phase channel and a quadrature phase channel of FIG. 7;

FIG. 9 is a diagram showing a three-dimensional distribution of an input base band image signal of FIG. 4;

FIG. 10 is a diagram showing a three-dimensional sub-block configuration of FIG. 9;

FIG. 11 is a diagram showing a unit sub-block of FIG. 10 in a spatio-temporal region;

FIG. 12 is a diagram showing limitation of resolution of FIG. 4;

FIG. 13 is a diagram showing an extraction region of a DC component of FIG. 4;

FIG. 14 is a diagram showing a unit region for adaptively selecting a motion picture of FIG. 4;

FIG. 15 is a diagram showing a unit region for adaptive modulating of FIG. 4;

FIG. 16A and FIG. 16B are diagrams showing analog and digital bit assignment of FIG. 4;

FIGS. 17A-17C are charts showing data transmission formats of transmission channels of FIG. 4; and FIGS. 18A and 18B are charts showing transmission gamma process of FIG. 4.

DETAILED DESCRIPTION OF THE PREFERRED EMBODIMENT

Referring to FIG. 4, if a digital HD image signal is applied to a motion adaptive scanning converter 14 by photographing an object in a HD camera unit 12, the motion adaptive scanning converter 14 carries out a motion adaptive scanning conversion of the HD image signal and generates a baseband image signal in a source and display format as shown in FIG. 5. In FIG. 5, the format is for fitting a HD-MUSE signal standard to the MIT proposal system. In this case, the three-dimensional distribution of the baseband image signal of FIG. 5 is shown in FIG. 9. A three-dimensional QMF bank and adaptive selector 16 receives the baseband image signal of FIG. 9 in a digital signal process (DSP) format of FIG. 6, and divides the baseband image signal into in ratio of 8:8:4 with respect to horizontal axis: vertical axis: time axis, respectively, to thereby form 256 sub-blocks as shown in FIG. 10. In this case, the divided unit sub-block in a spatio-temporal region is shown in FIG. 11. Next, the three-dimensional QMF bank and adaptive selector 16 adaptively selects a second sub-block having twenty-two sub-blocks in the order of an image energy distribution among the 256 sub-blocks in dependence on the motion information of an input image signal. Moreover, a luminance low frequency component and a chrominance component constitute a first sub-block having twelve base sub-blocks, i.e., four luminance low frequency components, four chrominance components of R-Y and four chrominance components of B-Y which have a resolution limitation as shown in FIG. 12. The four sub-blocks of FIG. 12 are a base band of low frequency component in spatial-temporal during dividing into 256 sub-bands as shown FIG. 10, which are always transmitted in regardless of the kind of the input image. The first and second sub-blocks are transmitted through an exclusive analog channel and a data-under-channel, respectively. Meanwhile, a transmission channel and the amount of transmission data of the first and second sub-blocks is shown in table 1.

TABLE 1

| area | transmission information | the amount of transmission data |
|---|---|---|
| exclusive digital channel; 255 lines total transmission amount; 255 × 320 × 2 = 163.2 kbit/F | DC information; 205 lines total transmission amount; 131.2 kbit/F a first block adaptive constant; 505 lines total transmission amount; 32 kbit/F | 45 lines × 80 samples × 8 bits × 3 (Y,R-Y,B-Y) = 86.4 kbit/F total transmisson amount; 86.4 + ECC 90 lines × 160 samples × 12 blocks × 3 bits × 1/(5 × 5 sub-blocks) = 20.736 kbit/F total transmission amount; 20.736 + ECC |
| exclusive analog channel; 270 lines total transmission amount; 270 × 320 × 2 = 172.8 kspl/F | a first sub-block (the number of block; 12) (Y = 4, R-Y = 4, B-Y = 4) | 90 lines × 160 samples × 12 blocks = 172.8 kspl/F |
| data-under channel; 505 lines | a second sub-block; 495 lines (the number of block; 22) location information; 274 lines total transmission amount; | 90 lines × 160 samples × 22 blocks = 316.8 kspl/F 90 lines × 160 samples × 8 bits = 115.2 kbit/F total transmission amount; |

TABLE 1-continued

| area | transmission information | the amount of transmission data |
|---|---|---|
| | 175.36 kbit/F a second block adaptive constant; 90 lines total transmission amount; 57.6 kbit/F aural information; 141 lines total transmission amount; 90.24 kbit/F | 115.2 × ECC 90 lines × 160 samples × 22 blocks × 3 bits × 1/(5 × 5 sub-blocks) = 38.016 kbit/F total transmission amount; 38.016 + ECC MUSE audio output = 1350 kbit/sec 1350/15F = 90 kbit/F |
| HD ViTS + VD | 12 samples per line 2 lines (1 channel) | 12 × 1050 × 1 = 12.6 kspl/F 2 × 332 = 0.664 kspl/F |

In the above table 1, ECC is an error correction code. When adaptive selecting the sub-blocks, 8×8 of horizontal axis × vertical axis becomes a unit area, and 1280 samples of an original image in a horizontal axis are equally divided by 160 and 720 lines in a vertical axis are equally divided by 90, as shown in FIG. 14. FIG. 14 illustrates the unit area of the location information for corresponding sub-blocks adaptively selected in the three-dimensional QMF bank and adaptive selector 16. In order to reproduce the brightness of the luminance and chrominance components, in a YIQ DC data transmitter 18 as shown in FIG. 13, a low frequency area (horizontal 80 samples and vertical 45 lines indicated by a hatched area) at which a DC component is dense, is extracted and transmitted through an exclusive digital channel as shown in table 1 by digitally converting Y, I (or R-Y) and Q (or B-Y) to 8 bits. A luminance high frequency component (a portion excepting for the hatched area) is transmitted through a data-under-channel by assigning one bit as shown in table 1. Thus, the inter-channel interference can be reduced by greatly decreasing the level of a modulation signal. Further, a filter selection data transmitter 20 converts location information of the second sub-block to digital data according to the adaptive selection and transmits it through the data-under-channel as shown in table 1. Thus, even if the CNR (channel to noise ratio) is under 25 dB, the base picture quality can be assured.

By the adaptive selection as hereinabove described, since only 34 sub-blocks among 256 sub-blocks is transmitted, bandwidth compression effect of approximately one-eighth is generated. Moreover, the influence of the channel noise can be reduced by transmitting the first sub-block through the exclusive analog channel instead of the data-under-channel.

In an adaptive modulator 22, adaptive modulation is carried out with respect to the first sub-block having twelve sub-blocks and the adaptive selected second sub-block having twenty-two sub-blocks from the three-dimensional QMF bank and adaptive selector 16. That is, as shown in FIG. 15, 5×5 of horizontal axis × vertical axis becomes a unit region, and the adaptive modulation is performed by dividing the original image signal into 576 regions of equally divided 32 horizontal regions and 18 vertical regions. Moreover, the adaptive modulator 22 amplifies low amplitude signals with respect to the thirty-four sub-blocks up to a maximum permissible transmission level and transmits its amplification coefficient, i.e., an adaptive constant in digital data. Thereafter, in order to reproduce the original image signal in a receiving side, the received signal level is divided by the adaptive constant. In this case, since the level of the channel noise is also divided by amplification coefficient, the transmission channel noise included in the amplified low amplitude signal is reduced. When adaptive modulating, the luminance low frequency component and the chrominance component are regarded as a base sub-block and a first block adaptive constant is transmitted through the exclusive digital channel as shown in table 1, in a first block adaptive constant transmitter 24. The luminance high frequency component is regarded as the rest block and a second block adaptive constant is transmitted through the data-under-channel as shown in table 1, in a second block adaptive constant transmitter 26.

In a transmission gamma processor 28, transmission gamma process of the adaptive modulated signal is performed as shown in FIG. 18A. That is, since a noise component is conspicuous in a dark place but it is inconspicuous in a bright place, a low level signal is previously non-linearly processed as shown in FIG. 18A when transmitting the signal at a transmitting side, to thereby greatly raise the signal. When receiving the signal, the signal process having a reverse characteristic is performed as shown in FIG. 18B, to thereby recover the original signal level. Thus, during receiving the signal, the original signal level is recovered without distortion and since the incoming noise component during the channel transmission is suppressed as much as nonlinear portion, the noise is reduced.

The gamma-processed transmission signal is supplied to a data-under-processor 34. A signal encoded in a MUSE (multiple sub-Nyquist sampling encoding) method from an audio signal processor 30 is supplied to the data-under-processor 34 through a transmission rate converter 32 for converting a transmission rate. Then, the location information with respect to the second sub-block from the filter selection data transmitter 20, the second block adaptive constant from the second block adaptive transmitter 26, the gamma-processed transmission signal and the transmission rate converted signal are applied to the data-under-processor 34 which reduces the input analog signal and inserts data bits into the first two or more most significant bits to transmit the signal in the form of the analog signal component being added to the digital signal component through said data-under-channel as shown in FIG. 16B In FIG. 16A, bit assignment is shown in case that image analog sample value in the analog channel becomes 8 bits. Here, a least significant bit (LSB) is represented by 0 and a most significant bit (MSB) is represented by 7. FIG. 16B shows that bit assignment in case that the image analog sample value is reduced to one-fourth. That is, the most significant bit of 7 is shifted to the right-hand side by 2 bits so as to remove the least significant bit of 0 and 1. A lower bit following the most significant bit becomes a dummy bit and "0" is inserted thereto, and then digital data is assigned into the most significant bit. In the receiving side, the original signal level can be restored by twice shifting the analog sample value to the most significant bit side. Therefore, an analog signal and digital data can be transmitted and received through one channel, and this becomes the data-under-channel. Accordingly, data shown in table 1 can be transmitted through the exclusive digital channel, exclusive analog channel and data-under-channel in data transmission formats as shown in FIGS. 17A to 17C, respectively and twice transmission bandwidth compression effect is obtainable.

In a first multiplexer 36, each data transmitted through the exclusive analog channel, exclusive digital channel and data-under-channel shown in table 1 from the YIQ DC data transmitter 18, the first block adaptive constant transmitter 24 and the data-under-processor 34 is multiplexed in a data transmission format of FIG. 7. That is, the data transmission format is for transmitting image data divided into sub-band, various data and aural data through the taboo channel of 6 MHz by using the DSB-QM. The multiplexed data from the first multiplexer 36 is scrambled in a scrambler 42, and therefore, the channel noise is uniformly dispersed to the entire area of a screen. Thus, the effect of the reduced noise can be obtained. In this case, from a pseudo random number (PRN) data generator 38, PRN data for the scrambling in a temporal axis is generated, and from a PRN address generator 40, a PRN row address and a PRN column address for the scrambling in a spatial region in response to the PRN data are generated. The scrambler 42 stores the multiplexed data in a predetermined area and scrambles the data according to the PRN row address and the PRN column address. The PRN data generator 38 generates the PRN address in the time axis direction, i.e., the PRN address in the different order per frame. In the receiving side, however, the original signal is reproduced by recovering the order of the PRN address by the PRN data. Further, the scrambling of the spatial region is carried out by the PRN address generator 40 and the scrambling of the time axis is performed by the PRN data generator 38, to thereby implement the three-dimensional scrambling. Thus, since there is perfect scrambling effect and secret function, application for military purpose and a commercially employed pay TV, etc., is possible.

In a second multiplexer 44, the scrambled signal and the PRN data is time-divisionally multiplexed together with a horizontal synchronizing signal HD for the horizontal synchronization of transmission image signal, a vertical synchronizing signal VD for the vertical synchronization of the transmission image signal and a signal ViTS for used in transmission channel deterioration characteristic compensation which are generated from a signal generating circuit not shown, in in-phase and quadrature channel transmission formats as shown in FIGS. 8A and 8B, respectively. This is for channel-multiplexing the transmission format shown in FIG. 7 as shown in FIGS. 8A and 8B so as to perform DSB-QM in a modulating unit 100. In this case, to multiplex the PRN data from the scrambler 42 as separate digital data is for obtaining the scrambling effect in a still picture. Moreover, the second multiplexer 44 produces the data of the in-phase channel transmission format, where a line signal in the order of even numbers is multiplexed, and the data of quadrature channel transmission format, where a line signal in the order of odd numbers is multiplexed, to first and second channel equalizer filters 46 and 48, respectively. Here, the second multiplexer 44 assigns the image data, various data and aural data into the exclusive digital channel of 255 lines, exclusive analog channel of 270 lines and the data-under-channel of 505 lines, respectively as shown in table 1. The vertical synchronizing signal VD and the signal ViTS for used in the channel deterioration compensation are assigned into 2 lines. In the in-phase channel of FIG. 8A, the horizontal synchronizing signal HD, vertical synchronizing signal VD and signal ViTS are inserted but in the quadrature channel of FIG. 8B, logic "0" data is inserted instead thereof. This is for conforming to phase of the transmitting and receiving side so as to regenerate clock of the receiving side. The data of the in-phase channel and quadrature channel transmission formats are channel-equalizing-filtered in the first and second equalizing filters 46 and 48, respectively, and are produced to a radio frequency signal $S_{out}$ by performing DSB-QM by carrier in the modulating unit 100. The operation of the modulating unit 100 is identical to that in FIG. 1. Moreover, the carrier $C_{in}$ applied to the modulating unit 100 is a carrier and is same with that applied to the modulating unit 100 of FIG. 1. The output radio frequency signal $S_{out}$ utilizes the taboo channel of VHF channel and UHF channel in the presently used NTSC system.

Meanwhile, the encoding system and method according to the present invention can be used for not only the HDTV of high picture quality and high tone quality but secret conference for military purpose, information transmission, TV application products such as a commercially used tape TV and the like, digital video tape recorder of high picture quality, video codec for broadband integrated services digital network (BISDN) of 64 kbps lines, telecine and kineco compatible with a film of 35 mm, electronic printing and publishing, etc.

As described above, in an encoding system of a simulcast HDTV and method thereof capable of transmitting an image signal of high picture quality and an aural signal of high tone quality, by using the HDTV bandwidth compression utilizing the three-dimensional sub-band coding, adaptive modulation for suppressing the channel noise and ghost, transmission gamma process, scrambling, DSB-QM for raising the efficiency of a transmission channel and data-under-technique, the improved picture quality in comparison with the MIT proposal system can be obtained.

While the present invention has been particularly shown and described with reference to the preferred embodiment thereof, it will be understood by those skilled in the art that foregoing and other changes in form and details may be made without departing from the spirit and scope of the present invention.

What is claimed is:

1. An encoding system of a simulcast high definition television, comprising:

motion adaptive scanning converting means for carrying out a motion adaptive scanning conversion of a high definition television image signal, to produce a base band image signal in a source and display format;

three-dimensional quadrature mirror filter bank (QMF) and adaptive selecting means connected to said motion adaptive scanning converting means, for dividing said base band image signal in ratio of 8:8:4 with respect to horizontal axis: vertical axis: time axis into 256 sub-blocks, transmitting a first sub-block having twelve sub-blocks of a luminance low frequency component and a chrominance component through an exclusive analog channel, and transmitting a second sub-block having twenty two sub-blocks through a data-under-channel together with digital location information by adaptively selecting said second sub-block among said 256 sub-blocks in response to motion information of the input image signal;

YIQ DC data transmitting means connected to said three-dimensional QMF bank and adaptive selecting means, for extracting a low frequency region, said low frequency region at which a DC component per transmission frame being dense, in response to the adaptive selection of said three-dimensional QMF bank and adaptive selecting means, converting the extracted data into digital data, to thereby transmit the extracted digital data through an exclusive digital channel, and transmitting a luminance high frequency component through said data-under-channel;

filter selection data transmitting means connected to said three-dimensional QMF bank and adaptive selecting means, for converting location information of said second sub-block in response to the adaptive selection of said three-dimensional mirror filter bank and adaptive selecting means into digital data so as to transmit the converted digital data through said data-under-channel;

adaptive modulating means connected to said three-dimensional QMF bank and adaptive selecting means, for carrying out an adaptive modulation by amplifying a low amplitude signal up to a maximum permissible transmission level of a reference value with respect to said first and second sub-blocks from said three-dimensional QMF bank and adaptive selecting means;

first block adaptive constant transmitting means connected to said adaptive modulating means, for transmitting a first block adaptive constant with respect to the luminance low frequency component and chrominance component in dependence on the adaptive modulation of said adaptive modulating means through said exclusive digital channel;

second block adaptive constant transmitting means connected to said adaptive modulating means, for transmitting a second block adaptive constant with respect to the luminance high frequency component in dependence on the adaptive modulation of said adaptive modulating means through said data-under-channel;

transmission gamma processing means connected to said adaptive modulating means, for non-linearly processing the adaptive modulated transmission signal from said adaptive modulating means, to thereby raise said low level signal thereof;

audio signal processing means for encoding an audio signal in a multiple sub-Nyquist sampling encoding (MUSE) method;

transmission rate converting means connected to said audio signal processing means, for converting a transmission rate in order to multiplex the encoded audio signal from said audio signal processing means and the transmission gamma processed image signal from said transmission gamma processing means;

data-under-processing means connected to said transmission rate converting means, for receiving the location information with respect to said second sub-block, said second block adaptive constant, said transmission gamma processed image signal and the transmission rate converted audio signal, reducing the input analog signal and substituting data bits into the first two or more most significant bits to transmit a signal in the form of the analog signal component being added to the digital signal component through said data-under-channel;

first multiplexing means connected to said data-under-processing means, for multiplexing each data transmitted through said exclusive analog channel and said data-under-channel from said YIQ DC transmitting means, said first block adaptive constant transmitting means and said data processing means, in a given transmission format;

pseudo random number (PRN) data generating means for generating pseudo random number data, in order to perform scrambling in a time axis;

pseudo random number (PRN) address generating means connected to said PRN data generating means, for generating a PRN row address and a PRN column address being different order per transmission frame, in response to said pseudo random number data, in order to perform scrambling of a space area;

scrambler means connected to said first multiplexing means, for storing the multiplexed data from said first multiplexing means in a given area, and carrying out scrambling by said PRN row address and said PRN column address;

second multiplexing means connected to said scrambler means, for receiving the scrambled signal from said scrambler means, said PRN data and a horizontal synchronizing signal, a vertical synchronizing signal and a channel deterioration compensation signal, to thereby multiplex a line signal in the order of even numbers of said scrambled signal, said horizontal synchronizing signal, said vertical synchronizing signal and said channel deterioration compensation signal in an in-phase channel transmission format, and to multiplex a line signal in the order of odd numbers of said scrambled signal and logic "0" data in a quadrature phase channel transmission format, said logic "0" data being inserted in a signal region of said horizontal synchronizing signal, said vertical synchronizing signal and said channel deterioration compensation signal so as to perform clock recovery of receiving side;

first equalizing filter means connected to said second multiplexing means, for channel-equalizing-filtering data of said in-phase channel transmission format;

second equalizing filter means connected to said second multiplexing means, for channel-equalizing-filtering data of said quadrature phase channel transmission format; and modulating means connected to said first and second equalizing filter means, for performing a double side band-quadrature modulation (DSB-QM) on the channel-equalizing-filtered in-phase channel and quadrature phase channel data from said first and second channel equalizing filters by a carrier, to thereby produce a radio frequency signal.

2. The system as claimed in claim 1, wherein said three-dimensional QMF bank and adaptive selecting means adaptively selects said 256 sub-blocks by dividing the input image signal into 8-by-8 unit areas of horizontal axis to vertical axis.

3. The system as claimed in claim wherein said adaptive modulating means adaptively modulates said first and second sub-blocks by dividing the input image signal into 5-by-5 unit areas of horizontal axis to vertical axis.

4. A encoding method of a simulcast high definition television, comprising the steps of:

a) dividing a base band signal of a high definition television into 8:8:4 with respect to horizontal axis: vertical axis: time axis into sub-blocks, to thereby transmit a first sub-block having twelve sub-blocks of a luminance low frequency component and a chrominance component through an exclusive analog channel and to transmit a second sub-block having twenty-two sub-blocks through a data-under-channel together with digital location information by adaptively selecting said second sub-block among said 256 sub-blocks in response to motion information of an input image signal;

b) extracting a low frequency region, said low frequency region at which a DC component per transmission frame being dense, in response to the adaptive selection, converting the extracted data into digital data, to thereby transmit said extracted digital data through an exclusive digital channel, and transmitting a luminance high frequency component to said data-under-channel;

c) converting location information of said second sub-block in response to said adaptive selection into digital data, so as to transmit the converted digital data through said data-under-channel;

d) adaptively modulating said first sub-block having twelve sub-blocks and the adaptive selected second sub-block having twenty-two sub-blocks;

e) transmitting a first block adaptive constant with respect to the luminance low frequency component and chrominance component through said exclusive digital channel, and transmitting a second block adaptive constant with respect to the luminance high frequency component through said under channel, in response to the adaptive modulation;

f) non-linearly processing the adaptive modulated signal, to thereby raise a low level signal thereof;

g) encoding an audio signal in a MUSE and converting a transmission rate;

h) reducing the analog signals of said location information with respect to said second sub-block, said second block adaptive constant, the transmission gamma processed image signal and the transmission rate converted audio signal, and substituting data bits into the first two or more most significant bits to transmit a signal in the form of the analog signal component being added to the digital signal component through said data-under-channel;

i) multiplexing the transmission data of step b), said first block adaptive constant of step e) and the transmission data of step h) in a transmission format, and carrying out scrambling by pseudo random number (PRN) data and PRN row and column addresses in dependence on said PRN data;

j) multiplexing the scrambled signal in the order of even numbers, a horizontal synchronizing signal, a vertical synchronizing signal and a channel deterioration compensation signal in an in-phase channel transmission format, and multiplexing the scrambled signal in the order of odd numbers in a quadrature phase channel transmission format; and k) channel-equalizing-filtering the multiplexed in-phase and quadrature channel data and carrying out a double side band-quadrature modulation (DSB-QM).

5. The method as claimed in claim 4, wherein said 256 sub-blocks are adaptively selected by dividing the input image signal into 8-by-8 unit areas of horizontal axis to vertical axis, in step a).

6. The method as claimed in claim 4, wherein said first and second sub-blocks are adaptively modulated by dividing the input image signal into 5-by-5 unit areas of horizontal axis to vertical axis, in step d).

7. The method as claimed in claim 4, wherein said scrambled signal in the order of odd numbers is multiplexed by inserting logic "0" data in a signal region of said horizontal synchronizing signal, said vertical synchronizing signal and said channel deterioration compensation signal so as to perform clock recovery of receiving side, in step j).

* * * * *

UNITED STATES PATENT AND TRADEMARK OFFICE
CERTIFICATE OF CORRECTION

PATENT NO. : 5,202,755
DATED : April 13, 1993
INVENTOR(S) : Tae-Kwon Yang, et al.

It is certified that error appears in the above-indentified patent and that said Letters Patent is hereby corrected as shown below:

Column 6,

Line 5,     after "115.2", change " X " to -- + --;

Column 11,

Line 64,     after "in", change "claim" to --claim 1--:

Signed and Sealed this

Eleventh Day of June, 1996

*Attest:*

BRUCE LEHMAN

*Attesting Officer*      *Commissioner of Patents and Trademarks*